Figure 1:
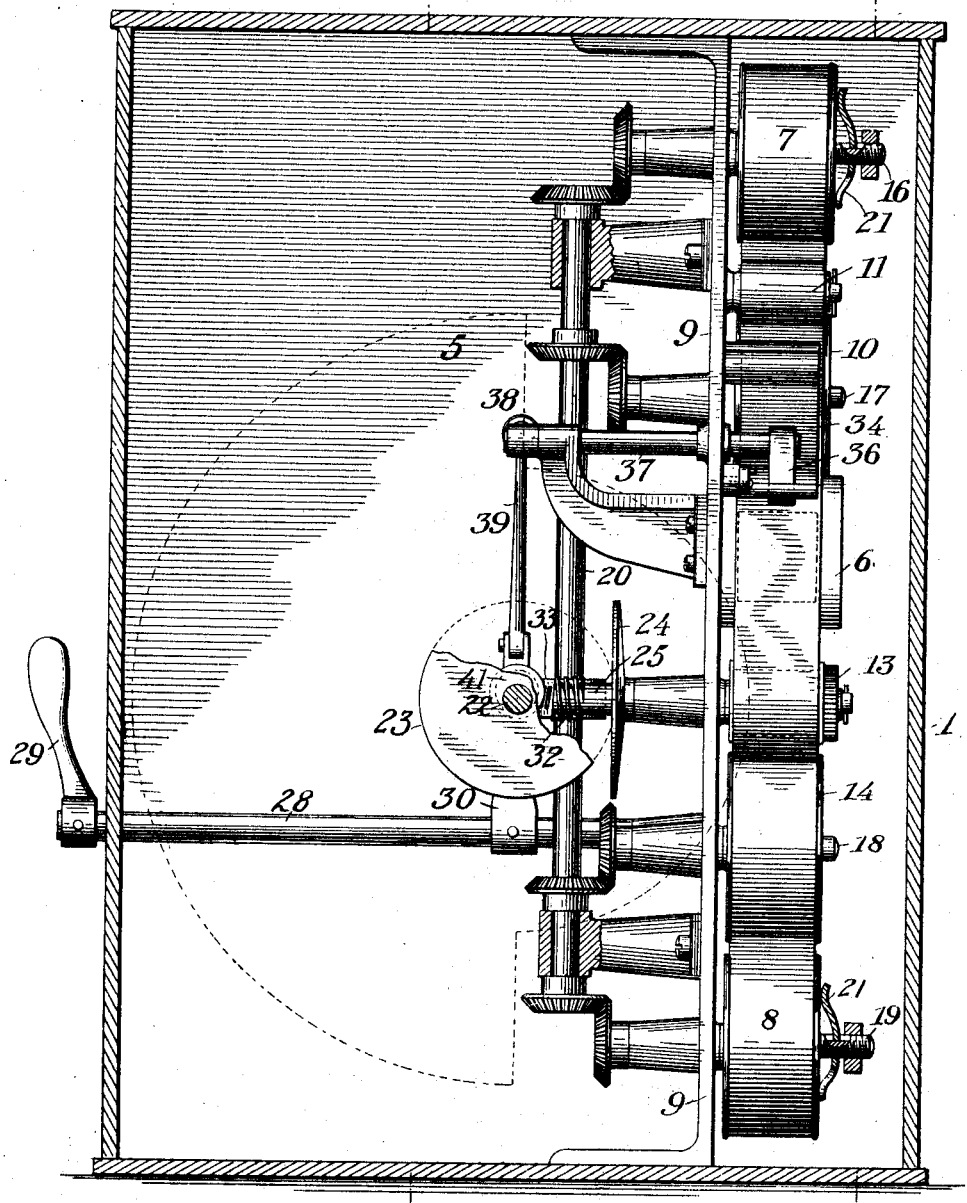

No. 666,495. Patented Jan. 22, 1901.
H. CASLER.
CONSECUTIVE VIEW APPARATUS.
(Application filed Feb. 26, 1896.)
(No Model.) 3 Sheets—Sheet 1.

Witnesses,
Richard S. Hoopman
Frank C. Avery

Inventor,
Herman Casler
by John T. Easton
Atty

No. 666,495. Patented Jan. 22, 1901.
H. CASLER.
CONSECUTIVE VIEW APPARATUS.
(Application filed Feb. 26, 1896.)
(No Model.)
3 Sheets—Sheet 2.

Witnesses,
Richard S. Llonom
Frank C. Avers

Inventor,
Herman Casler
by John T. Easton
Atty

No. 666,495. Patented Jan. 22, 1901.
H. CASLER.
CONSECUTIVE VIEW APPARATUS.
(Application filed Feb. 26, 1896.)
(No Model.) 3 Sheets—Sheet 3.
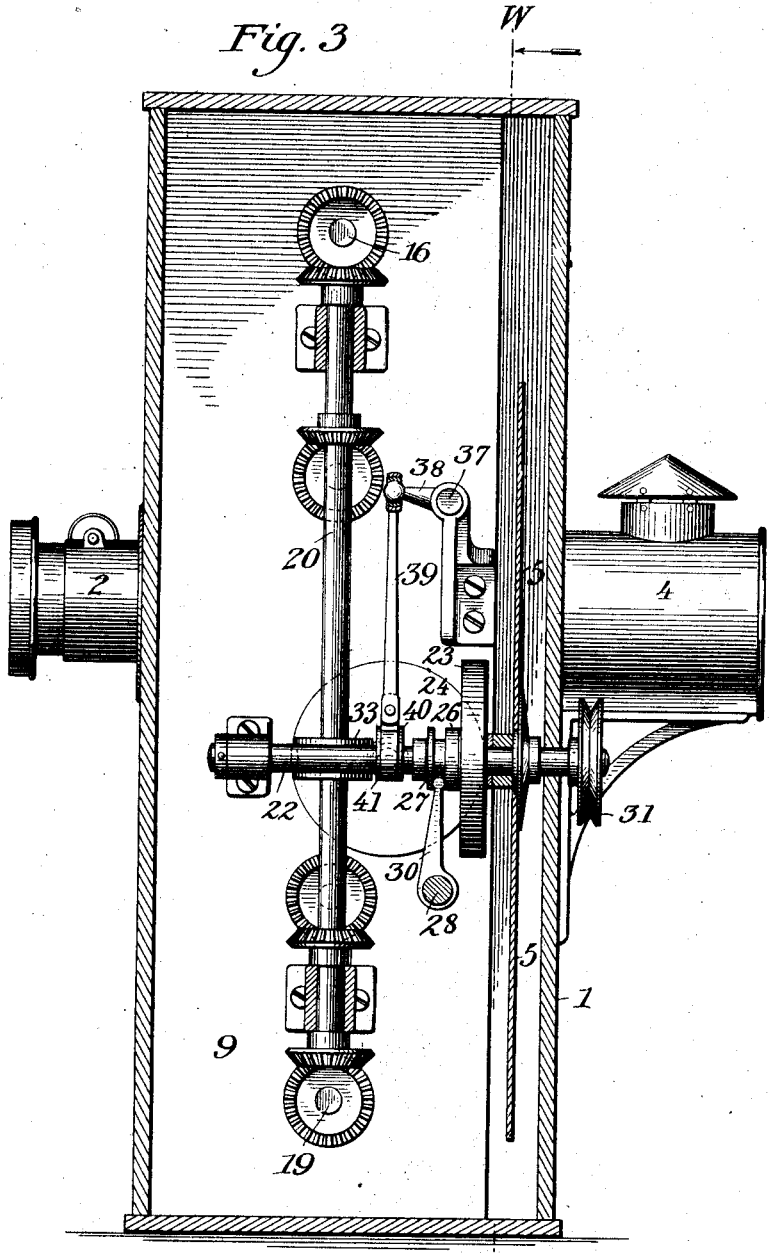

UNITED STATES PATENT OFFICE.

HERMAN CASLER, OF CANASTOTA, NEW YORK.

CONSECUTIVE-VIEW APPARATUS.

SPECIFICATION forming part of Letters Patent No. 666,495, dated January 22, 1901.

Application filed February 26, 1896. Serial No. 580,810. (No model.)

*To all whom it may concern:*

Be it known that I, HERMAN CASLER, a citizen of the United States, residing at Canastota, in the county of Madison and State of New York, have invented a new and useful Improvement in Consecutive-View Apparatus; and I do hereby declare the following to be a full, clear, and exact description of the invention, such as will enable others skilled in the art to which it appertains to make and use the same.

My invention relates to consecutive-view apparatus and to strip or film feeding mechanism therefor, and particularly to projecting-lanterns designed to reproduce upon a screen the movements of moving objects by means of a rapid succession of views of said objects, showing the different positions assumed in their movements. In projecting-lanterns of this description heretofore used great difficulty has been experienced in securing sufficient illumination, because the film-feeding mechanisms employed for bringing into the field of the lens successive views produce so much vibration when operated at the required speed that it has been impracticable to permit the passage of light through the film during more than a brief portion of the time during which each view is actually within the field of the lens, and also because the small pictures necessarily used require excessive enlargement by the lantern in order to produce satisfactory results, it having been found impossible hitherto to produce a strip-feeding mechanism, either for cameras for taking the pictures or for projecting-lanterns, which is capable of sufficiently rapid feeding of the film to produce or utilize larger views.

In the camera which forms the subject-matter of a separate application for Letters Patent of even date herewith, Serial No. 580,811, I have produced a camera capable of producing upon a flexible sensitive photographic film a rapid succession of negative views of moving objects, and this instrument is capable of taking much larger views than instruments for similar purposes heretofore used.

In the instrument which forms the subject-matter of this application I have shown and described a projecting-lantern capable of producing upon a screen the movements of objects which have been photographed by a consecutive-view camera by means of a flexible sensitive film carrying a succession of positive views, such as may be made by printing upon sensitive film the negative views produced by a consecutive-view camera. The film-strip-feeding mechanism employed in this projecting instrument and which forms the essential feature thereof is a modification of the film-feeding mechanism used in my consecutive-view camera.

My invention consists in the novel means provided for compensating for slipping or shrinkage of the film, in the novel means provided for rewinding the film, in the novel construction of the film-feeding apparatus, and in the novel combination, construction, and arrangement of the parts of the apparatus.

The objects of my invention are, first, to provide a projecting-lantern for reproducing upon a screen the motion of moving objects which shall be capable of producing views of larger size and with better illumination than have been produced by lanterns for similar purposes heretofore used; second, to provide an improved film-feeding apparatus for feeding the picture-strip; third, to provide means for compensating for shrinkage of the film or slipping of the film-feeding mechanism; fourth, to provide improved means for rewinding the film, and, fifth, to make the projecting-lantern simple in construction, compact, durable, and easily operated. These objects are attained in the projecting-lantern herein described, and illustrated in the drawings which accompany and form a part of this application, in which the same reference-numerals indicate the same or corresponding parts, and in which—

Figure 2:
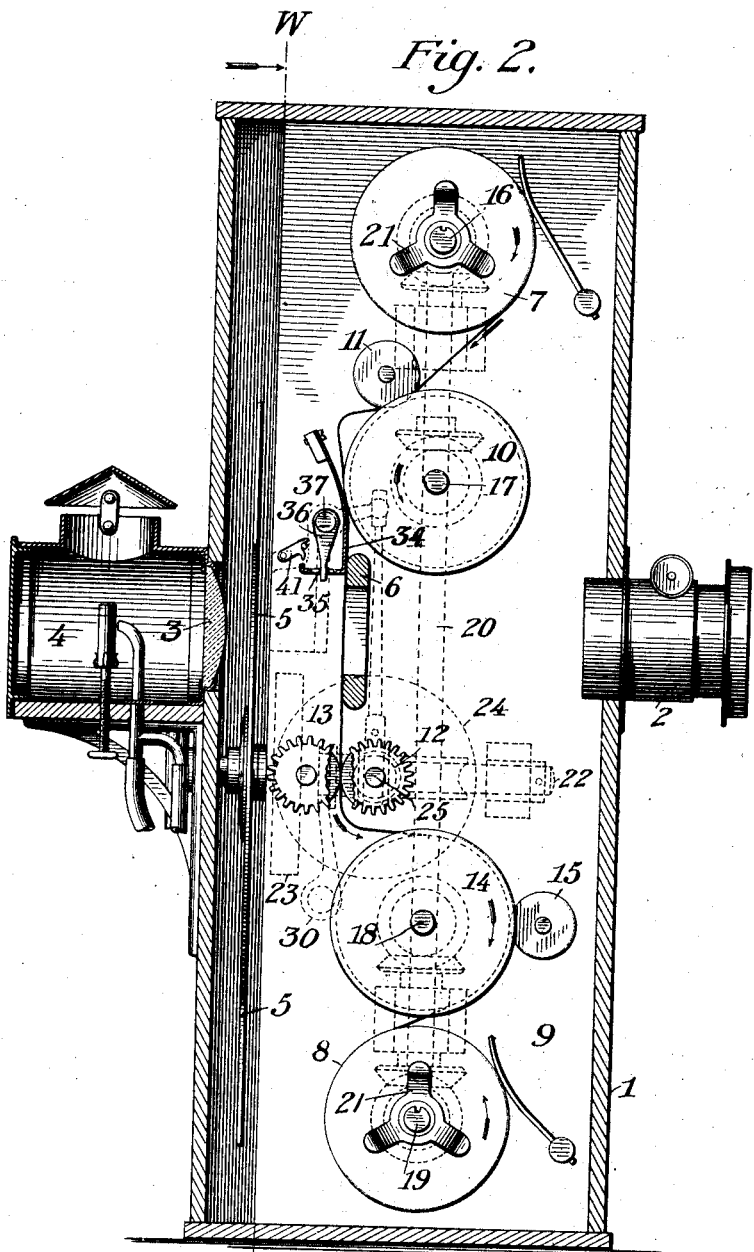

Figure 1 shows an end view of the mechanism of the projecting-lantern and is a section upon the line *w w* of Figs. 2 and 3, the shutter-disk being shown by dotted lines. Fig. 2 shows the right-hand side of the mechanism, particularly the strip-feeding drums and rollers, and is a section on the line *x x* of Fig. 1. Fig. 3 shows the left-hand side of the mechanism, especially the shafts and gearings by which the strip-feeding drums and rollers are operated, and is a section on the line *y y* of Fig. 1.

In the drawings, 1 is the box which incloses the mechanism of the lantern. In its front face is an ordinary objective lens 2 and in its rear face is a condensing-lens 3, behind which is supported a calcium light or other suitable means of illumination. Between the lens and the objective 2 is a shutter-disk 5, the contour of which is shown in Fig. 1 by dotted lines, revolubly mounted and arranged in its revolution to cut off light for a portion of the time, and also a support 6 for a transparent and flexible strip carrying or having on its surface a succession of views which are to be projected by the lantern upon a screen. The plate 6 is apertured to permit the passage of light between the lenses. The picture-strip is drawn from a spool 7 and as it passes through the field of the lens is wound upon a second spool 8. These spools, together with the strip-feeding mechanism and the support 6, are supported by a transverse frame plate or partition 9, secured to the bottom and top of the case 1. The strip unwinds from the spool 7 and passes between a delivery-drum 10 and an idler-roll 11, (see Fig. 2,) which serves to hold the strip in contact with the drum 10, and thence over the supporting-plate 6, between auxiliary feeding-rolls 12 and 13, the function of which is to feed the strip across the field of the lens and over a take-off drum 14, against the surface of which it is held by an idler-roll 15, and thence upon the winding-spool 8. The spool 7, drums 10 and 14, and the spool 8 are mounted upon shafts 16, 17, 18, and 19, respectively, which have bearings in projecting bosses in the supporting-plate 9, and these shafts are driven by bevel-gears from a vertical shaft 20, mounted upon the left-hand side of the frame-plate 9 in Figs. 1 and 3. The shaft 20 is itself driven by means to be hereinafter described.

The delivery and take-off drums 10 and 14 are secured to the shafts upon which they are mounted. The spools 7 and 8 are loose upon the shafts upon which they are mounted, but may be connected therewith and driven therefrom by friction connections formed by three-legged spring-collars 21 21, mounted upon and themselves secured to the shafts 16 and 19 and pressed against the ends of the spools 7 and 8 by screw-nuts. By pressing against the ends of the spools these collars produce sufficient friction to cause the spools to revolve. In the operation of the machine the spring-collar of the spool from which the film is being drawn is always relieved by unscrewing its nut, so that the spool shall not be driven by its shaft, but shall revolve only as the strip is unwound from it by the feeding mechanism. This is to prevent too-rapid unwinding of the strip from the spools. In order to allow for possible slipping of the picture-strip, as well as to allow for the increase in diameter of the spool upon which the strip is wound, as the strip is wound from the one spool to the other, the gearing is so designed that the spools 7 and 8 tend to rotate at a slightly-greater peripheral speed than the drums 10 and 14 when they are driven by their shafts. The tension on the picture-strip as it is fed forward by the drums 10 and 14 causes the spool upon which the strip is wound to revolve slightly slower than its shaft, slipping somewhat beneath the spring-collar 21.

The vertical shaft 20 is driven by a horizontal driving-shaft 22 by means of a variable-speed gearing, the purpose of which will be apparent hereinafter. The shaft 22 carries a friction-wheel 23, and a corresponding friction-disk 24 is mounted upon a horizontal shaft 25 at right angles to the shaft 22, the periphery of the wheel 23 being in contact with the surface of the disk 24, so as to drive the disk 24 by frictional contact. The friction-wheel 23 revolves with its shaft, but is splined or keyed thereto, so as to be capable of longitudinal motion thereon, and has a hub 26, with a groove 27 therein. A rock-shaft 28, the end of which projects outside of the case 1 and carries a handle 29, has an arm 30, the end of which enters the groove 27. By moving the hand-lever 29 the friction-wheel 23 may be caused to move along its shaft 22 toward or away from the center of the friction-disk 24, thus varying the speed of the friction-disk 24 and shaft 25 with respect to the wheel 23 and shaft 22. The shaft 22 is provided with a band-wheel 31 outside of the case 1, by which it may be revolved from some external source of power.

The shaft 25 carries a worm 32, which engages with a worm-wheel 33 upon the vertical shaft 20. Rotation of the band-wheel 31 and driving-shaft 22 therefore causes rotation of the shaft 20 and the operation of the parts of the feeding mechanism driven thereby. The auxiliary feed-roll 12 above mentioned is mounted upon and driven by the same shaft 25 upon which the friction-disk 24 and worm 32 are mounted. The auxiliary feed-roll 13 is mounted upon a spindle and is geared to the roll 12 to revolve at an equal speed therewith. The gearing by which the shaft 25 drives the shaft 20 and the diameter of the auxiliary feed-rolls 12 and 13 are such that the peripheral velocity of the auxiliary feed-rolls is twice or somewhat more than twice as great as the peripheral velocity of the feed-drums 10 and 14. This is in order that the auxiliary feed-rolls, which, as will be seen subsequently, operate to feed forward the picture-strip during about one-half of the time, may feed forward as much of the strip as is fed forward by the drum 10, which operates continuously.

The auxiliary feed-rolls 12 and 13 are always in contact with the picture-strip and always tend to feed the same. The movement of the picture-strip across the plate 6 is prevented, however, during the time that the shutter is open by a spring-catch 34, which presses the picture-strip against the supporting-plate 6. The end of the spring 34 is upturned and has in it a slot 35, in which works an arm 36, mounted upon a rock-shaft 37, which projects through and has bearings in the supporting-plate 9 and carries upon its inner end an arm 38, which is moved up and down by an eccentric-rod 39, secured to an eccentric-strap 40 of an eccentric 41, mounted upon the driving-shaft 22. The rock-shaft 37 and arm 38 are thereby caused to vibrate each time the driving-shaft 22 revolves, each time lifting the spring 34 and permitting a portion of the picture-strip to be fed across the plate 6 by the action of the auxiliary feed-rolls 12 and 13. The position of the arm 36 and its amplitude of movement and the length of the slot 35 are so adjusted that the spring 34 holds the picture-strip when the shutter is open and releases it as soon as the shutter is closed.

The shutter-disk 5, which controls the passage of light through the film, is a disk secured to the driving-shaft 22, with its periphery in line with the axis of the condensing and objective lenses. A portion of the periphery of the shutter-disk is cut away, so as to permit the passage of light, as shown in dotted lines in Fig. 1.

The operation of my projecting-lantern is as follows: The position of the parts of the mechanism of the lantern as shown in the drawings is that occupied when the shutter is open and a picture is in the field of the lenses 2 and 3. The picture-strip is being unwound from the spool 7 and is being wound upon the spool 8, the spool 8 being driven by its shaft 19 through the spring-collar 21. The auxiliary feed-rolls 12 and 13 are revolving at somewhat more than twice the peripheral velocity of the drums 10 and 14 and are in contact with the picture-strip, but are unable to move the same, as the strip is held by the spring-catch 34 pressing it against the plate 6. A loop of loose strip is being formed between the drum 10 and the plate 6, and a similar loop previously formed below the auxiliary feed-rolls 12 and 13 is being taken up by the drum 14. The instant the shutter-disk 5 in its revolution cuts off the light from the lens 3 the arm 36 upon the rock-shaft 37 trips the spring 34, lifting it away from the plate 6, and thus releases the picture-strip. The auxiliary feed-rolls 12 and 13 instantly draw this picture-strip across the field of the lens until the loop of loose strip between the drum 10 and the plate 3 has been taken up. This is all done during the time that light is cut off. An instant afterward in its revolution the shutter-disk 5 again permits the passage of light, the arm 36 swinging backward and permitting the spring 34 to press the picture-strip against the plate 6 an instant before the shutter opens, and so holding the picture-strip stationary. By the feeding forward of the strip during the time the shutter was closed a new picture has been brought into the field of the lens, and this picture is now projected by the lantern upon the screen in place of the picture previously projected. The alternations of light and darkness take place so rapidly that the fact that the light is not continuous is not observed, neither is the change of picture observed, but only the appearance of motion of the images seen upon the screen due to the gradual change in positions of these images in the successive views. The take-off drum 14 carries away the strip as it is fed forward by the auxiliary rolls 12 and 13, and the strip is wound from the drum 14 upon the spool 8. The greater portion of the work of feeding the picture-strip is done by the constantly-revolving drums 10 and 14, the auxiliary feed-rolls 12 and 13 being required only to do the work of feeding the short length of film which is between these rolls and the drum 10. The rock-shaft 37, upon which the arm 36 that operates the spring-catch is mounted, is driven from the same horizontal shaft 22 which carries the shutter-disk 5. Therefore the operation of the catch 34 is always synchronous with the operation of the shutter and is not affected by any change in speed of the strip-feeding mechanism with relation to the speed of the shutter. If there were no slipping of the picture-strip upon the feed-rolls and no shrinkage of the strip, such as is due to atmospheric causes or such as frequently takes place during development, there would be no occasion for varying the speed of the film-feeding mechanism with respect to the shutter, and the relative speed of the film-feeding mechanism to the shutter might be constant, as in the camera described in my said application, Serial No. 580,811; but slipping and shrinkage of the strip frequently take place to a slight extent, the one causing a smaller length of film to be fed across the field of the lens than is proper each time the catch 34 is operated and the other causing too great a length of film to be fed across the field of the lens than is proper. Too rapid or too slow feeding of the film has the effect of causing the picture upon the screen to apparently creep up or down the screen; but by altering slightly the length of picture-strip fed across the field of the lens each time the catch 34 is operated, which may be done by varying the speed of the film-feeding mechanism with respect to the speed of the shutter, this creeping of the picture may be prevented. For this reason the variable-speed mechanism shown in Fig. 3, and comprising the friction-wheel 23 and disk 24 and the parts connected therewith, is employed. By moving the hand-lever 29 so as to move the wheel 23 toward the center of the disk 24 the speed of the disk 24, shafts 25 and 20, and the film-feeding drums may be increased. By moving the hand-lever 29 so as to move the wheel 23 toward the circumference of the disk 24 the speed of the disk 24 and the shafts 25 and 20 and the feed-drums may be reduced. In this manner the operator, watching the picture upon the screen, may move the hand-lever 29 so as to keep this picture practically stationary, so far as its position upon the screen is concerned, without regard to slipping of the film between the feed-rollers, which may take place, or to shrinkage of the strip, which may have taken place. After the picture-strip has been nearly unwound from the supply-spool 7 the operation of the apparatus is stopped. In order to rewind the strip upon the spool 7, so as to prepare for another exhibition, a door in the side of the case (not shown) is opened to afford access to the mechanism within the case, and the spring-catch 34 is lifted away from the plate 6 and a small detent 41 is dropped to hold the spring away from the plate 6, so as to leave the strip free. The nut upon the shaft 16 is screwed down, so as to press the collar 21 upon said shaft against the spool 7, and the nut upon the shaft 19 is relieved, so as to leave the spool 8 loose upon said shaft. The band-wheel 31 is then rotated in reverse direction, winding the strip from the spool 8 to the spool 7. When the strip has been wound upon the spool 7 sufficiently far, rotation of the wheel 31 is stopped, the nut upon the shaft 16 is loosened and the nut upon the shaft 19 tightened, as before, the detent 41 is lifted to permit the spring to slip down against the plate 6, and the consecutive-view apparatus is again ready for operation.

The shutter and the feeding mechanism shown in the drawings are arranged to admit the passage of light during half the revolution of the shutter; but because all of the parts of the strip-feeding mechanism except the catch 34 and the parts which have directly to do with the operation thereof are in continuous and uniform motion, so that no vibration is caused thereby, the feeding mechanism is capable of feeding the required length of picture-strip in a much shorter time than one-half of the revolution of the shutter-disk at the speed at which it is necessary to operate the machine in order to produce the desired continuous effect upon the screen. In this manner the intensity of illumination upon the screen may be greatly increased by increasing the time during which the shutter is open. The strip-feeding mechanism may be caused to feed the strip so rapidly across the field of the lens that it will be possible to dispense entirely with the shutter and shutter mechanism in many cases, the strip being fed so rapidly across the field of the lens when it moves and the time during which it is motionless in said field being so much longer than the time when it is moving across the field of the lenses that when it does move this motion will be imperceptible to the eye.

Having thus completely described my invention, what I claim, and desire to secure by Letters Patent, is—

1. In a consecutive-view apparatus, the combination, with a flexible picture-strip containing a series of consecutive regularly-spaced views of a moving object, of continuously-moving strip-feeding devices for feeding the strip by frictional contact, an intermittently-operating catch arranged to grasp the strip intermittently and at intervals corresponding to the distance between the pictures, thereby momentarily preventing the feeding of the strip across the field of view, and variable-speed gearing by which the relative speed of the strip-feeding devices and catch may be varied during the operation of the apparatus, substantially as described.

2. In a consecutive-view apparatus, the combination, with the lenses and illuminating apparatus of a projecting apparatus, of continuously-moving strip-feeding devices for feeding a picture-strip through the field of said projecting apparatus, an intermittently-operating catch arranged to grasp the strip intermittently, thereby preventing momentarily the feeding of the picture-strip through the field of the projecting apparatus, and means for varying the length of strip fed forward while the strip is released by the catch, substantially as described.

3. In a consecutive-view apparatus, the combination, with the lenses and illuminating apparatus of a projecting apparatus, of continuously-moving strip-feeding devices for feeding a picture-strip through the field of said projecting apparatus, an intermittently-operating catch arranged to grasp the strip intermittently, thereby momentarily preventing the feeding of the picture-strip through the field of the projecting apparatus, and means for varying the relative speed of the strip-feeding mechanism and catch, whereby the length of strip fed forward each time the catch is released may be varied, substantially as described.

4. In a consecutive-view apparatus, the combination, with the lenses and illuminating apparatus of a projecting apparatus, of continuously-moving main feeding devices arranged to deliver and to carry away a picture-strip, auxiliary feeding devices moving continuously but at higher peripheral velocity than the main feeding devices, and arranged to feed the strip through the field of the projecting apparatus, acting upon the strip by frictional contact, an intermittently-operating catch arranged to grasp the strip intermittently, thereby preventing momentarily the feeding of the strip through the field of the projecting apparatus, and a changeable-speed gear connecting the driving members of the strip-feeding devices and of the catch, whereby the speed of the strip-feeding devices relative to the catch may be varied, substantially as described.

5. In a consecutive-view apparatus, the combination, with the lenses and illuminating apparatus of a projecting apparatus, of a supply-spool carrying a picture-strip, a delivery feeding-drum arranged to unwind the strip from said spool, auxiliary feed-rolls acting upon the strip by frictional contact and having a greater peripheral velocity than said delivery-drum, and arranged to feed the strip through the field of the projecting apparatus, a winding-spool upon which the strip may be wound, means for rotating said spool, a take-off drum arranged to carry the strip from the auxiliary feed-rolls to said winding-spool, an intermittently-operating catch arranged to grasp the film intermittently, thereby preventing momentarily the feeding of the strip through the field of the projecting apparatus, and changeable-speed gearing connecting the driving members of the catch and delivery-drum, whereby the rate of feeding of the strip through the apparatus, relative to the speed of the catch, may be varied, substantially as described.

6. In a picture-strip-feeding mechanism for consecutive-view apparatus, the combination, with a delivery-drum for delivering the strip, a take-off drum for carrying away the strip, means for holding the strip in contact with said drums, a winding-spool, a shaft geared to said drums and winding-spool for rotating the same, and auxiliary feed-rolls likewise geared to said shaft and arranged to rotate at a higher peripheral velocity than said delivery and take-off drums, of a catch arranged to grasp the strip and prevent it from being fed by said auxiliary feed-rolls, a shaft and connecting mechanism operated thereby for operating said catch intermittently, friction-disks connected to said shaft and to a shaft of the strip-feeding rolls, the periphery of one of said disks being in contact with the face of the other disk, and means for moving the first disk radially with respect to the second disk, whereby the speed of the strip-feeding rolls relative to the speed of the catch may be varied.

7. In a picture-strip-feeding mechanism for consecutive-view apparatus, the combination, with a supply-spool, a winding-spool, continuously-moving main feeding devices arranged to unwind the strip from the supply-spool and to carry the strip to the winding-spool, a shaft for driving the supply and winding spools and strip-feeding devices, and clutches connecting the driving-shaft with said supply and winding spools, whereby either of said spools may be thrown out of engagement with said shaft, of auxiliary feed-rolls for feeding the strip across the field of view, arranged to rotate at a higher peripheral velocity than the main feeding devices, an intermittently-operating catch arranged to grasp the strip intermittently and thereby to prevent the strip from being fed across the field of view, and a detent adapted to engage with the catch and hold the same out of contact with the strip.

8. In a consecutive-view apparatus, the combination, with a continuously-moving strip-feeding device for feeding a strip through the field of the apparatus, of an intermittently-operating catch arranged to grasp the strip intermittently, thereby momentarily preventing the feeding of the strip through the field of the apparatus, and speed-varying mechanism interposed between said feeding devices and said intermittently-operating catch, whereby the length of the strip fed forward each time the catch is released may be varied.

In testimony whereof I affix my signature in presence of two witnesses.

HERMAN CASLER.

Witnesses:
A. A. SCHENCK,
K. F. CASSIDY.